United States Patent [19]

Karpuk et al.

[11] Patent Number: 4,876,989
[45] Date of Patent: Oct. 31, 1989

[54] ENHANCED PERFORMANCE OF ALCOHOL FUELED ENGINE DURING COLD CONDITIONS

[75] Inventors: Michael E. Karpuk, Boulder; Scott W. Cowley, Lakewood, both of Colo.

[73] Assignee: Technology Development Associates, Inc., Wheat Ridge, Colo.

[21] Appl. No.: 192,243

[22] Filed: May 10, 1988

[51] Int. Cl.[4] .............................................. F02B 43/08
[52] U.S. Cl. ....................................... 123/3; 123/576;
123/180 AC
[58] Field of Search .................... 123/3, 576, 180 AC,
123/180 R

[56] References Cited

U.S. PATENT DOCUMENTS 4,408,572 10/1983 Yoon et al. ............................... 123/3
4,567,857 2/1986 Houseman et al. ...................... 123/3

FOREIGN PATENT DOCUMENTS 35257 3/1983 Japan ........................... 123/180 AC
160543 9/1983 Japan ........................... 123/180 AC

*Primary Examiner*—E. Rollins Cross
*Attorney, Agent, or Firm*—Robert E. Harris

[57] ABSTRACT

Apparatus and method are described for enhancing performance of an alcohol fueled engine during cold conditions, with such enhancement being particularly effected by generation of ether to assist cold operation including starting and/or to achieve reduced emissions during cold running. Dimethyl ether is generated by catalytic dehydration of vaporized methanol using a catalyst, preferably fluorinated alumina. Apparatus is disclosed for generating dimethyl ether on board as needed for immediate mixing with combustion air and methanol and/or for storage to enable later mixing of the dimethyl ether with combustion air and methanol to effect subsequent cold starts and/or cold running operations.

41 Claims, 6 Drawing Sheets

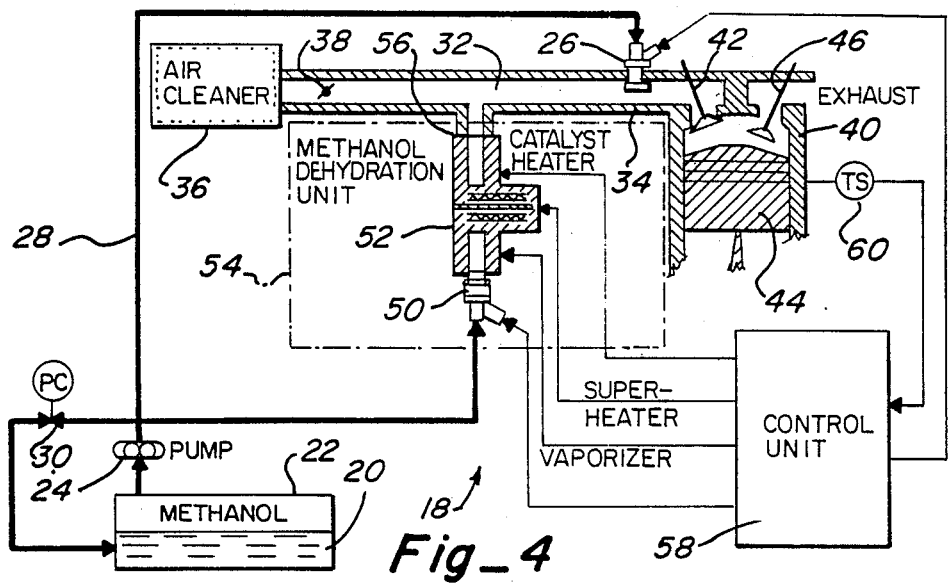
Fig_4
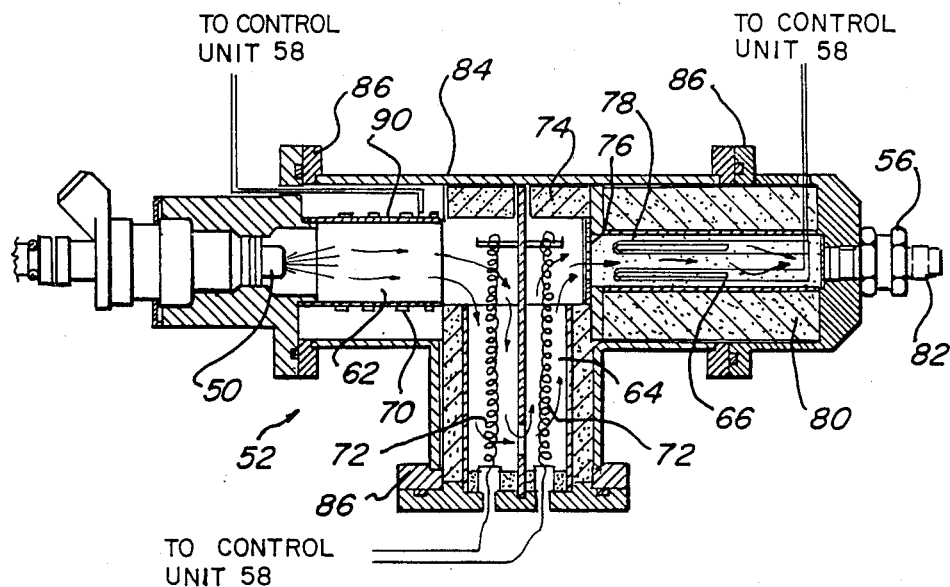
Fig_5

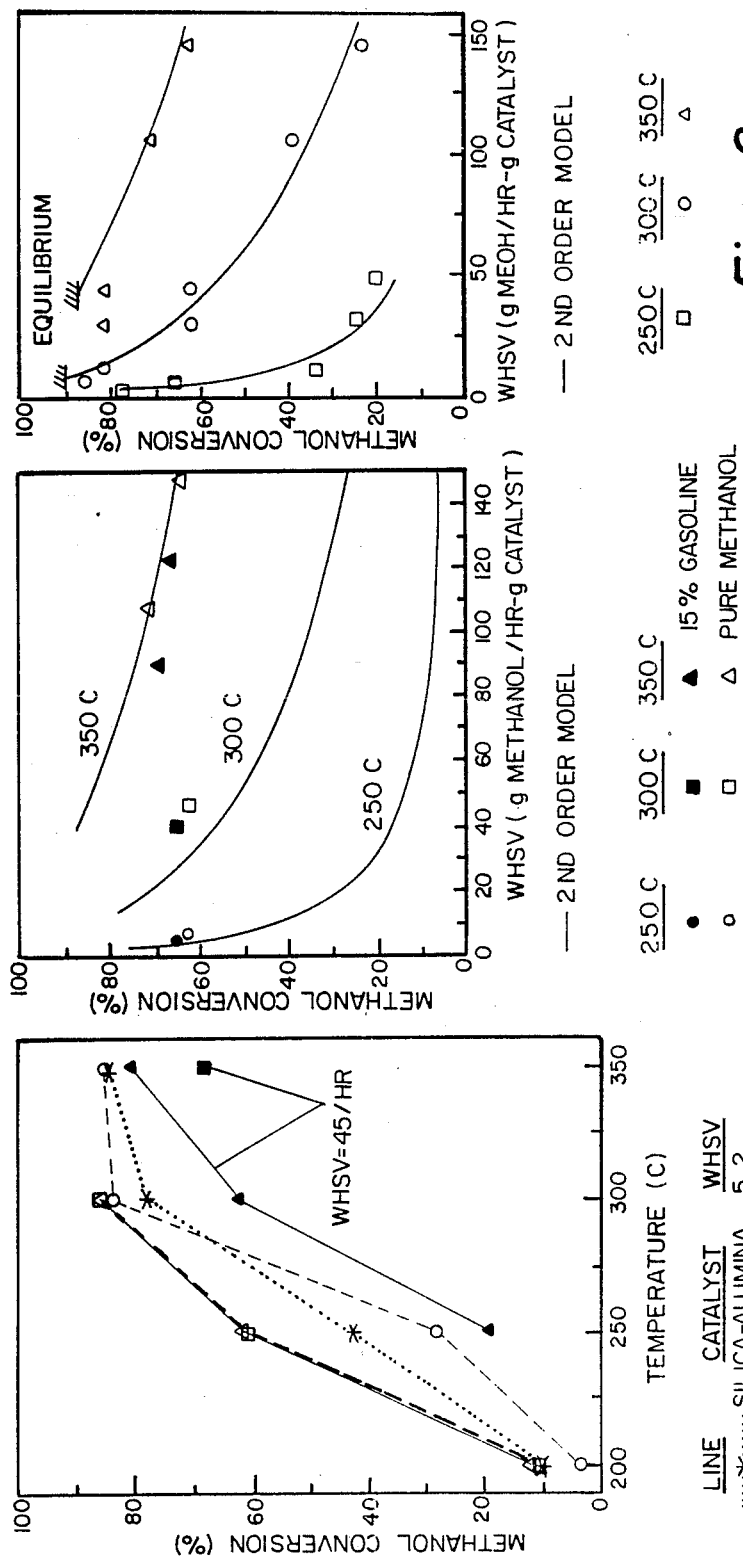

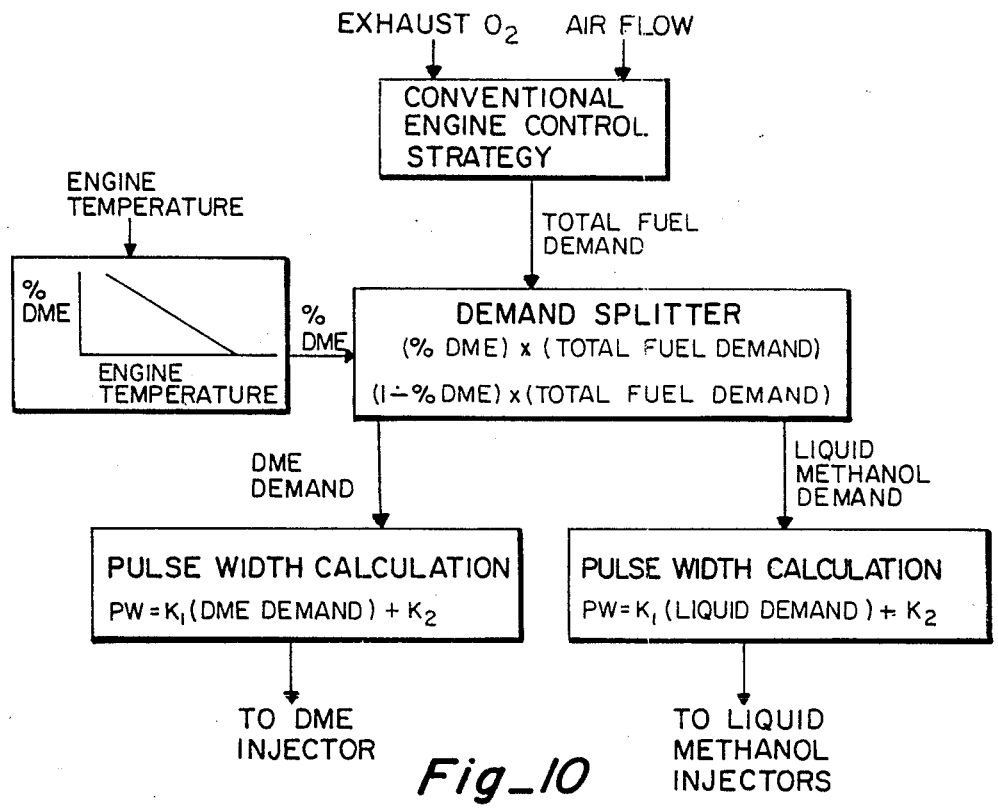
Fig_10
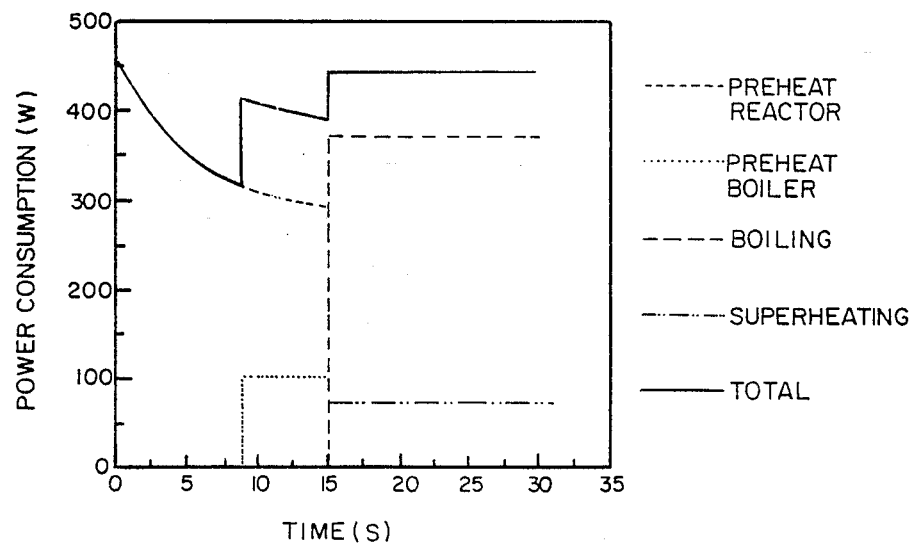
Fig_9

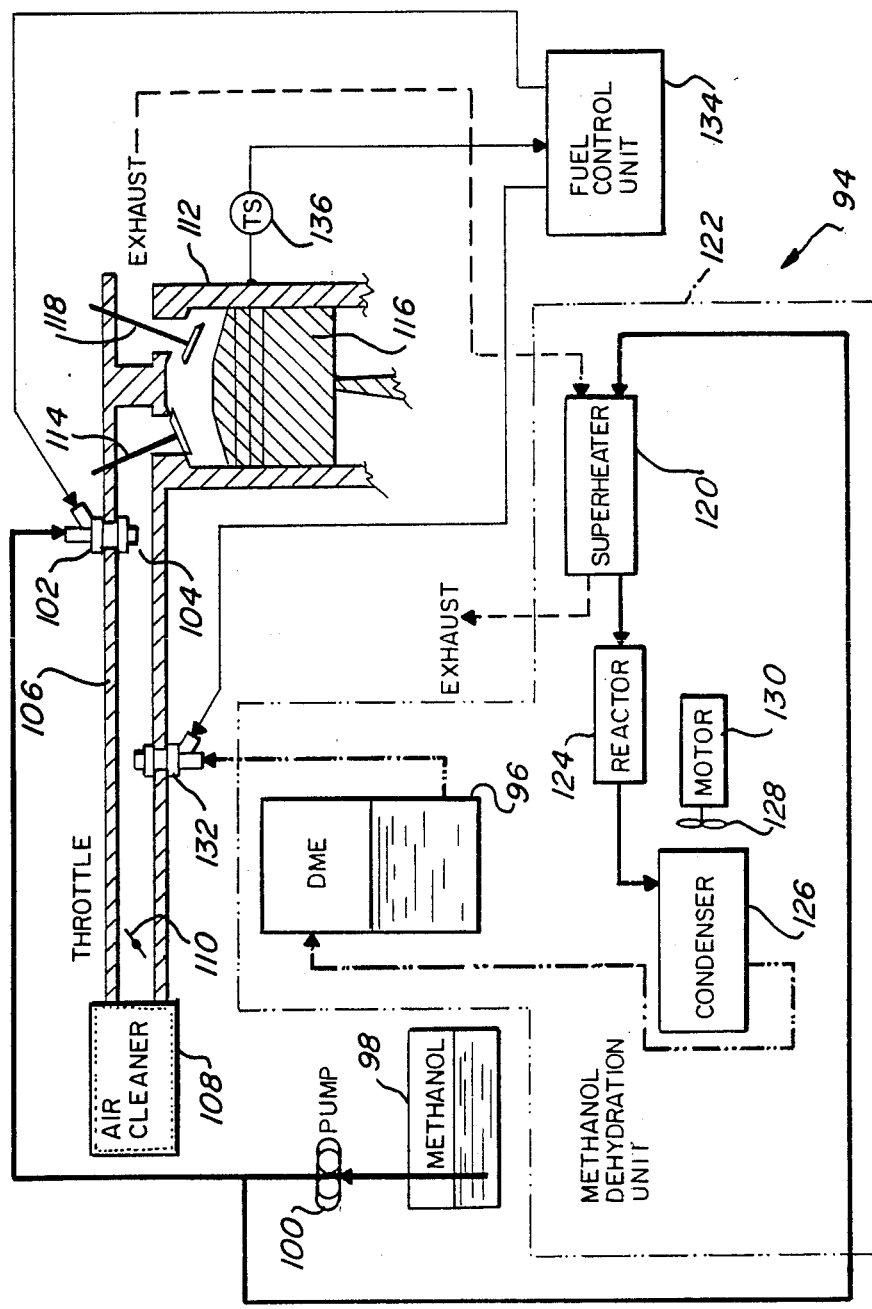
Fig_11

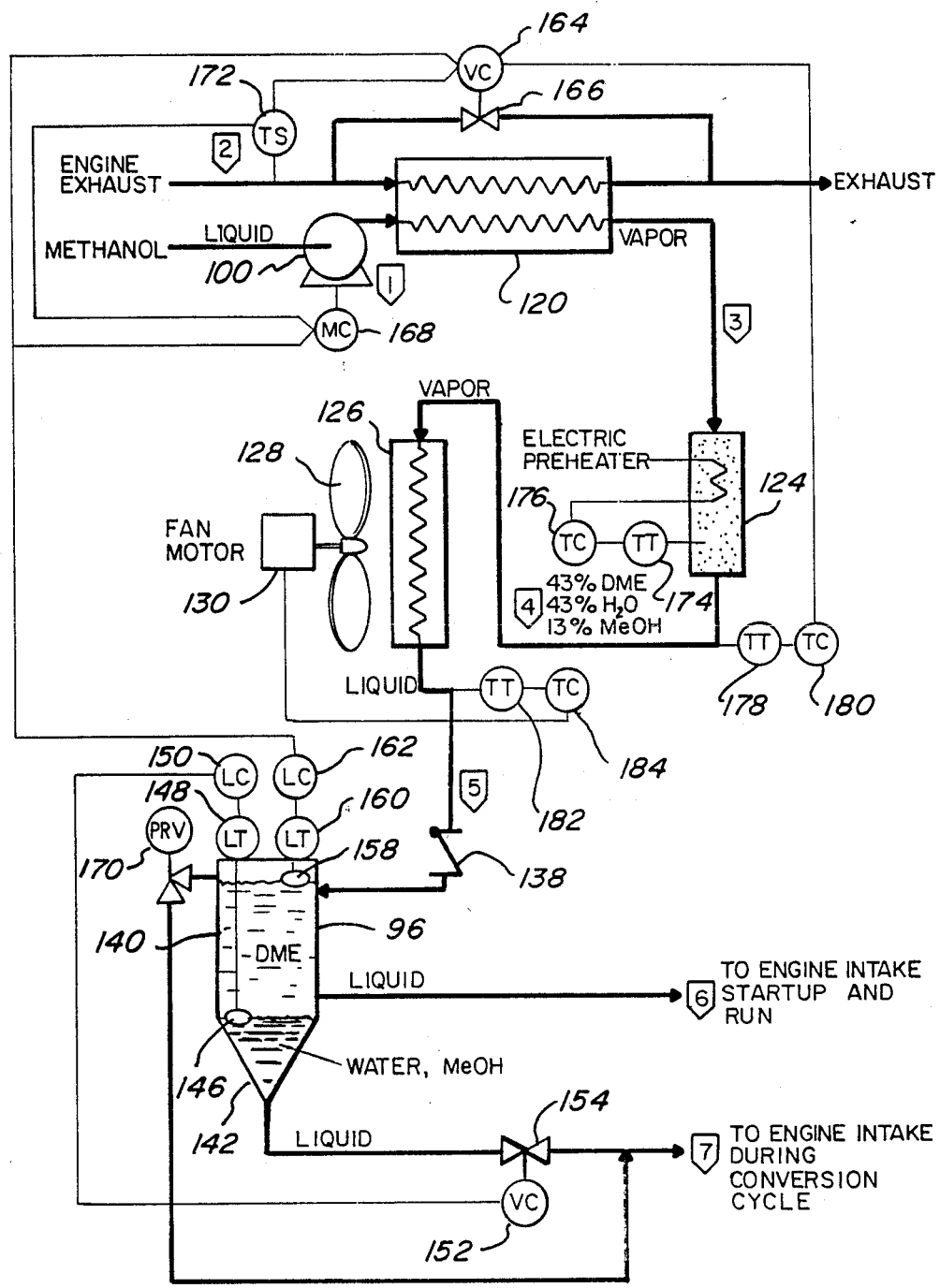
Fig_12

ENHANCED PERFORMANCE OF ALCOHOL FUELED ENGINE DURING COLD CONDITIONS

FIELD OF THE INVENTION

This invention relates to alcohol fueled engines, and relates, more particularly, to enhancing performance of methanol fueled, internal combustion engines during cold conditions.

BACKGROUND OF THE INVENTION

It has been heretofore shown that alcohol can be utilized to fuel an internal combustion engine, and it has also been heretofore shown that methanol can be produced efficiently and economically from a variety of feedstocks, including natural gas, coal and biomass. Methanol has, therefore, been widely considered as a replacement for gasoline and diesel fuel when petroleum supplies become scarce, and it has been suggested that the use of methanol to fuel vehicle engines would improve air quality by appreciably decreasing unburned hydrocarbon emissions (as compared, for example, with gasoline fueled vehicle engines).

The use of methanol to fuel a spark ignition (Otto cycle) internal combustion engine, however, has heretofore faced a significant cold start and/or cold running operation problem not normally found with respect to gasoline and diesel engines (although diethyl ether is now commercially offered as a cold start fluid even for such engines).

Now known methanol fueled vehicle engines have been found to be difficult to start at ambient temperatures below 10° C. due to the low vapor pressure and high heat of vaporization of methanol. In addition, even when a methanol fueled engine was somehow started, the associated vehicle was found to have poor driveability and/or high carbon monoxide (CO) and unburned hydrocarbon emissions were found to be emitted from the engine.

Various apparatus and methods have been heretofore suggested in an attempt to solve these problems, including the use of fuel and carburetor heaters to assist fuel vaporization, the use of methanol dissociation reactors to generate highly combustible gases, and the addition of volatile compounds to the methanol fuel.

With respect to electrical heating of an air/methanol fuel mixture to thereby allow cold starting at low temperatures, the required electrical power has been found to increase dramatically with decreasing temperatures and increasing engine load, and this has limited the useful application of electrical heating to conditions of moderate temperatures and low engine speeds and loads.

With respect to methanol dissociation, methanol can be dissociated according to the reaction:

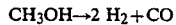

$$CH_3OH \rightarrow 2 H_2 + CO$$

with the reaction being highly endothermic and occurring in the presence of a catalyst above 250° C. The gaseous fuel produced is combustible over a wide range of temperatures and air/fuel ratios and therefore would theoretically allow cold starting to below any practical temperature. Electrically heated reformers suggested for heating the catalyst, however, have adversely affected performance of the resulting dissociation unit due to long warm-up periods required to bring the catalyst up to the reaction temperature, the large amounts of electrical power consumed, and/or the large size required for the unit. In addition, methanol dissociation catalysts are not compatible with gasoline (gasoline is usually added to methanol fuel to increase its flame luminescence for safety reasons).

With respect to additives, a number of additives have also been heretofore suggested and/or utilized for addition to methanol fuel to increase the vapor pressure of fuel to assist cold starting, and such suggested additives include butane, isopentane, winter grade gasoline, and, in some cases, dimethyl ether. While one or more of these additives have resulted in a fuel that would allow the engine to be reliably started at a lower temperature, such additives have heretofore not been shown to be sufficiently effective in providing a fuel that would allow the engine to be started at the lowest temperature at which gasoline fueled engines are commonly required to start by vehicle manufacturers (i.e., $-30.4°$ C. ($-30°$ F.)) and/or have not been generated on-board the utilizing vehicle. Moreover, at least some of these additives have been known to create other problems, including fuel system vapor lock at moderate temperatures, high evaporative emissions, and/or increase fuel costs.

With respect to the use of methanol to fuel an engine, it has also been suggested that a compression ignition engine (diesel cycle) could be modified for such use by converting methanol to dimethyl ether, continuously aspirating the dimethyl ether into the engine with combustion air and injecting methanol directly into the cylinder (see U.S. Pat. No. 4,422,412).

With particular respect to the generation and use of dimethyl ether, it is known that dimethyl ether can be generated by dehydration of methanol. It is also known that dimethyl ether can be generated using a number of different catalysts, with dimethyl ether formation apparently occurring over Lewis acid sites, Bronsted acid sites, or both, depending upon the particular catalyst utilized. Alumina, for example, is a widely used catalyst for dehydration of alcohol, and its activity appears to be mostly due to the presence of Lewis acid sites.

While equilibrium conversion of methanol to dimethyl ether has been found to be achievable using a number of catalysts, the rate at which the dehydration reaction proceeds has been found to differ depending upon the particular catalyst used. In order to increase dehydration activity, it has also been heretofore suggested that an alumina catalyst could be appropriately modified, and, accordingly, phosphated alumina, silicon-coated alumina, and titania-containing alumina have been suggested for use in this connection.

Thus, while different apparatus and/or methods have been heretofore suggested and/or utilized, apparatus and method providing a satisfactory solution to the cold starting and cold running operation problem has not been heretofore found for alcohol fueled, and, more particularly, methanol fueled, internal combustion engines.

SUMMARY OF THE INVENTION

This invention provides apparatus and method for enhancing performance of an alcohol fueled engine, and, more particularly, a methanol fueled engine, during cold conditions, which apparatus and method provides a solution for cold start problems and/or greatly reduces emissions during cold running operations.

In this invention, an ether, and, more particularly, dimethyl ether, is generated on-board the vehicle and mixed with combustion air and alcohol, and, more particularly, methanol when dimethyl ether is to be generated, to provide reliable cold starts and/or cold running operation to temperatures below about −30.4° C. The required ether can be generated and used at the time needed and/or can be generated and stored for future use.

With respect to dimethyl ether, the ether is generated by catalytic dehydration of methanol and the generated dimethyl ether is then mixed with the combustion air and methanol (or a mixture of methanol and gasoline), and a number of catalysts may be utilized, with fluorinated alumina being the now preferred catalyst.

It is therefore an object of this invention to provide enhanced performance of an alcohol fueled engine, and, particularly, a methanol fueled engine, during cold conditions.

It is still another object of this invention to provide an improved apparatus and method for on-board generation of ether from alcohol, and, particularly, dimethyl ether from methanol, and use of the ether to improve alcohol fueled engine performance during cold conditions.

It is another object of this invention to provide an improved apparatus and method for generation of ether from alcohol, and, particularly, dimethyl ether from methanol, and mixing of the ether with a mixture of alcohol, gasoline and combustion air to improve alcohol fueled engine performance during cold conditions.

It is another object of this invention to provide an improved apparatus and method for on-board generation and use of dimethyl ether to improve performance of a spark ignition engine.

It is still another object of this invention to provide an improved apparatus and method for producing dimethyl ether using fluorinated alumina as a catalyst.

It is another object of this invention to provide an apparatus for generating ether, and particularly dimethyl ether, on-board as needed for immediate mixing with combustion air and alcohol, and, particularly, methanol, to improve cold start and/or cold running operation of an internal combustion engine.

It is still another object of this invention to provide an apparatus for generating ether, and, particularly, dimethyl ether, on-board and storing the same for later mixing with alcohol, and, particularly, methanol, during subsequent cold starts or cold running operations.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiments of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which:

FIG. 4 is a block and schematic view illustrating apparatus according to this invention for generating dimethyl ether on board for immediate mixing with methanol;

FIG. 5 is a cut-away side view illustrating the dehydration reactor unit shown in FIG. 4;

FIG. 6 is a graphical illustration of methanol conversion versus temperature for selected catalysts;

FIG. 7 is a graphical illustration of dehydration of methanol with 15 volume percent gasoline over a 0.3% fluorinated alumina catalyst;

FIG. 8 is a graphical illustration of dehydration of methanol over a 0.3% fluorinated alumina catalyst;

FIG. 9 is a typical graphical illustration of the power requirements for the methanol dehydration reactor unit shown in FIG. 5;

FIG. 10 is a flow chart illustrating typical operation for apparatus as shown in FIG. 4;

FIG. 11 is a block and schematic view illustrating a second embodiment of the apparatus of this invention utilized to generate dimethyl ether on-board and store the same for subsequent cold start and/or cold running operations; and FIG. 12 is a block and schematic diagram illustrating typical operation of the apparatus as shown in FIG. 11.

DESCRIPTION OF THE INVENTION

Figure 1:
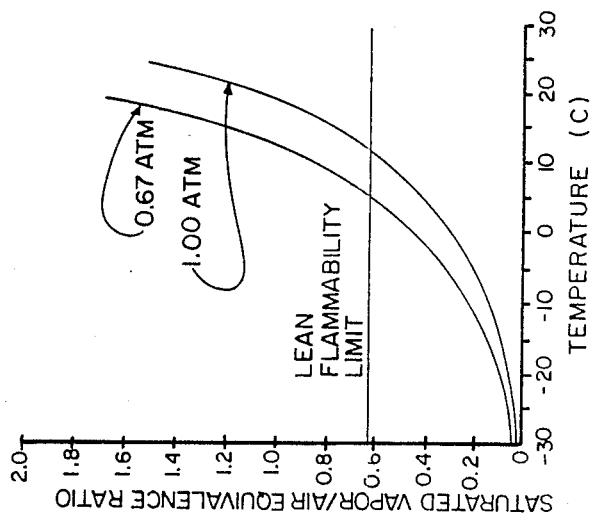
FIG. 1 is a graphical illustration of a known saturated vapor/air equivalence ratio versus temperature for methanol.

As illustrated by the graph of FIG. 1, mixtures of air saturated with methanol are not combustible at temperatures below 12° C. In this invention, ether, preferably dimethyl ether, is generated on-board a vehicle having an internal combustion engine mounted thereon, and the ether is then mixed with combustion air and the alcohol from which the ether was derived (methanol where dimethyl ether is generated) to provide for reliable cold starting and/or enhanced cold running operation of the engine, as well as reducing emissions under cold conditions.

Dimethyl ether (DME) is generated on-board by catalytic dehydration of methanol according to the following reaction:

$2\ CH_3OH \rightarrow CH_3OCH_3 + H_2O + Heat$

Figure 2:
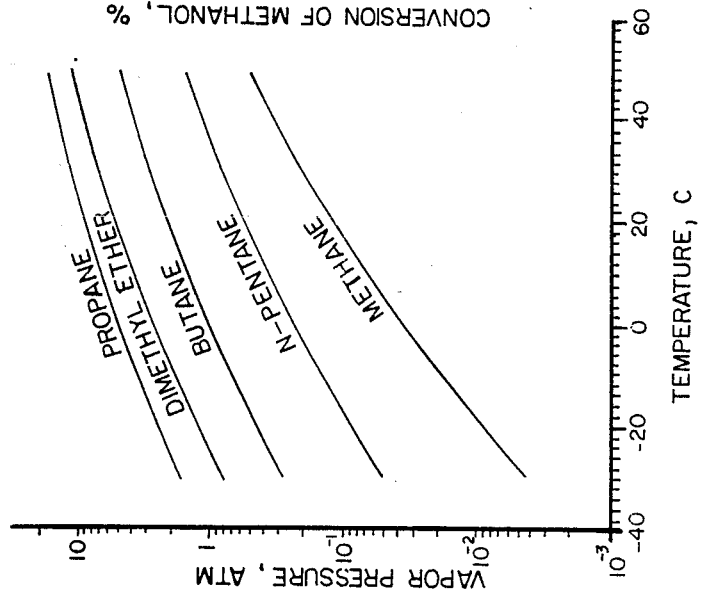
FIG. 2 is a graphical illustration of known vapor pressure versus temperature for selected fuels.

As illustrated by FIG. 2, DME has a vapor pressure between that of propane and butane, and DME has wide flammability limits so as to be capable of enabling engine cold starting and/or running to temperatures below about −30.4° C.

The methanol dehydration reaction is exothermic, but some energy input is required to vaporize the liquid methanol. The energy required to dehydrate methanol to dimethyl ether is, however, far less than that required to dissociate methanol to hydrogen and carbon monoxide, as is illustrated in Table I as follows:

TABLE I

| Energy Required To Dehydrate and Dissociate Methanol | | |
|---|---|---|
| Process | Dehydration | Dissociation |
| Vaporization & Superheating | 12,114 cal/gm-mole | 12,114 cal/gm-mole |
| Dehydration | −3,220 cal/gm-mole | |
| Dissociation | | 21,660 cal/gm-mole |

TABLE I-continued

| Energy Required To Dehydrate and Dissociate Methanol | | |
|---|---|---|
| Process | Dehydration | Dissociation |
| Total | 8,894 cal/gm-mole | 33,774 cal/gm-mole |
| Water Condensation | −5,260 cal/gm-mole | |
| Total | 3,634 cal/gm-mole | |
| Power for 1 kg/hr | 323 Watts | 1,227 Watts |
| With Water Condensation | 132 Watts | |

As illustrated in Table I, 12,114 cal/gm-mole is required for both reactions to vaporize the methanol and heat it to the necessary reaction temperature of 350° C. Methanol dehydration is exothermic with a net energy requirement of 8,894 cal/gm-mole, and if the water from the reaction is condensed and used to vaporize the methanol, only 3,634 cal/gm-mole is required to dehydrate the methanol. Methanol dissociation, on the other hand, is highly endothermic requiring a total of 33,774 cal/gm-mole. While methanol dehydration is utilized as discussed hereinafter, a combination of dehydration and dissociation might be utilized, at least in some instances.

Figure 3:
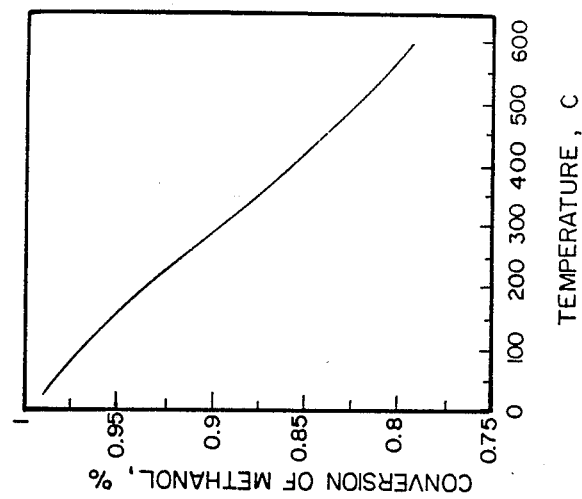
FIG. 3 is a graphical illustration of the known thermodynamic equilibrium for a methanol dehydration reaction.

The power required to dehydrate and dissociate methanol at a rate of 1 kg/hr is also illustrated in Table I, with the steady state power required to dehydrate methanol to dimethyl ether being much less than to dissociate methanol. The thermodynamic equilibrium for the methanol dehydration reaction, is shown in FIG. 3.

An on-board system 18 for generating DME from methanol and then substantially immediately mixing the generated DME with methanol and combustion air for providing the fuel mixture to a methanol fueled internal combustion engine is illustrated in FIG. 4.

As shown, methanol 20 is stored in tank, or reservoir, 22 and is pumped therefrom by pump 24 to fuel injector 26 through line, or conduit, 28, with pressure regulator 30 being connected between line 28 and tank 22. Methanol is injected by fuel injector 26 into passage, or mixing area, 32 (formed by passage walls 34). The methanol is injected into mixing area 32 as a finely dispersed aerosol and is vaporized within mixing area 32 by combustion air then present within the mixing area (providing such air is sufficiently heated). The methanol is mixed at mixing area 32 with incoming air passing through air cleaner 36 and past throttle 38. The mixture is then fed into cylinder 40 of the methanol fueled engine when inlet valve 42 is opened in conventional manner (while piston 44 is retracted and exhaust valve 46 is closed). It should be appreciated that while only one cylinder is illustrated in FIG. 4, an engine will normally have a plurality of cylinders as is conventional with internal combustion engines (either spark ignition engines or combustion ignition engines).

As also shown in FIG. 4, methanol from tank 22 is also pumped by pump 24 to fuel injector 50. Fuel injector 50 is connected to the input side of reactor 52 of methanol dehydration unit 54. Methanol injected into reactor 52 by fuel injector 50 is caused to be vaporized, heated and catalytically converted to dimethyl ether, with the DME generated by reactor 52 being supplied from the outlet side 56 of reactor 52 into passage, or mixing area, 32 for mixing with combustion air and methanol thereat.

As also indicated in FIG. 4, the operation is controlled by fuel control unit 58, which unit can be, for example, an engine control computer such as is now included in many automotive vehicles. Fuel control unit 58 is connected with temperature switch 60 (sensitive to the temperature of cylinder 40) and provides electrical output signals to fuel injectors 26 and 50, and also provides electrical output signals for controlling heating of vaporizer, superheater and catalytic sections 62, 64 and 66, respectively, of reactor 52.

Reactor 52 is preferably electrically heated and is designed to operate at or near equilibrium conversion of methanol to DME at a neat methanol flow rate of 1 kg/hr which is more than half of the idle fuel requirements of a 1.6 liter engine. Since the reactor is intended for on-board vehicle use, it is compact and lightweight, and for warm-up from cold ambient temperatures (of about −20° C.) to operating temperature, requires less than 15 seconds. While not specifically shown, all power requirements can be provided by the vehicle's conventional (normally 12 volt) battery/alternator system.

Reactor 52 is shown in greater detail in FIG. 5. As shown, methanol injected by injector 50 is sprayed into vaporizer, or boiler, section 62. Section 62 is heated by heater coil 70 so that the methanol is vaporized while at vaporizer section 62. The vaporized methanol from vaporizer section 62 is then directed to superheater section 64 where the vaporized methanol is heated by superheating coils 72 to the necessary reaction temperature (i.e., 350° C.).

Nichrome 80 is preferred for use as superheater coil wires 72. A design wire temperature of 850° C. has been used to gain long life, and such wires may be operated up to 1100° C. for short periods if necessary. As also shown in FIG. 5, insulation 74 may be provided for superheater section 64, as needed.

The heated vaporized methanol is then coupled through screen 76 to catalytic section 66. Heat is supplied to catalytic section 66 by coil 78 adjacent to catalyst 80. At catalytic section 66, the heated vaporized methanol is dehydrated to generate dimethyl ether. The thus generated DME is then coupled from the reactor at outlet nozzle 82 at output side 56 of reactor 52 (outlet nozzle 82 opens into passage 32 as indicated in FIG. 4).

Reactor 52 is designed to fit inside a standard 1½ inch butt weld, pipe "T" 84. The low operating pressure of the system allows the use of a thin wall, for the "T". Flanges 86 may be welded to the "T", if desired, so that the flange facings contain the sections, or subassemblies, of the reactor, whereby each subassembly can be easily removed for analysis, repair or reconfiguration with minimal disturbance to the rest of the reactor.

As also indicated in FIG. 5, vaporizer section 62 is defined by electrically heated copper tube 90 (1 inch OD) upon which the methanol from fuel injector 50 is sprayed. Vaporizer specifications are set forth in Table II as follows:

TABLE II

| Design Specifications for Electrical Vaporizer | |
|---|---|
| Parameter | Specification |
| Methanol Flow Rate Boiling Methanol | 1 kg/hr |
| Power | 370 W |
| Heat Flux | 280 kW/m$^2$ |
| Heating Wires | Nichrome 80/20 |
| Ribbon cross section | 0.0126 in. × 3/32 in. |
| Length | 17 cm |
| Resistance | 0.25 ohm |
| Configuration | Wrapped around 0.5 mm mica |

TABLE II-continued

| Design Specifications for Electrical Vaporizer | |
|---|---|
| Parameter | Specification |
| | insulator and Copper Tube at 5/32 in. center to center distance. |
| Boiler | |
| Copper tube | |
| OD | 1 in. |
| Wall thickness | 0.065 in. |
| Length | 1 in. |
| Area | 3.8 cm² |
| Temperatures | |
| Tube wall | 75° C. |
| Wire | 400° C. |

Methanol is fed to the vaporizer, or boiler, section 62 by electronic fuel injector 50 (which injector may be a conventional injector such as manufactured and sold by Bosch, or example). The methanol is injected into a cone shaped pattern so that the methanol impinges on boiler wall 90 which is maintained approximately 10° C. above the boiling point of the methanol. The vapor heat transfer mechanism was assumed to be nucleate boiling, and nichrome wire ribbon 70 was used to heat the copper tube forming the boiler wall.

Helical coils of Nichrome wire are utilized as superheater coils 72 of superheater section 64, with the heating elements being sized to bring the temperature of the vaporized methanol up to the 350° C. reactor temperature (four sets of wires, each having a nominal 10 volt drop, were utilized). Design specifications for the superheater are summarized in Table III as follows:

TABLE III

| Design Specifications for Electrically Operated Superheater | |
|---|---|
| Parameter | Specification |
| Methanol Flow Rate | 1 kg/hr. |
| Temperature Rise | 60° C. to 350° C. |
| Power Required | 70 W |
| Overall Heat Transfer Coefficient | 26 W/m²K |
| Log-Mean Temperature Difference | 630° C. |
| Area Required | 34 cm² |
| Wire Heater | |
| Type | Nichrome |
| Diameter | 0.032 in. |
| Length | 240 cm |
| Number of Segments | 4 |
| Resistance; each segment | 1.25 ohm |
| Weight | 6 g |
| Configuration | 4 electrically parallel helically coiled wires. Leading 2 sets are controlled separately from the second 2 sets. |

Four catalysts were selected for possible use in catalytic section 66, including a high surface area γ-alumina, a phosphated γ-alumina (containing a phosphorous-to-alumina ratio of 1.0), an amorphous silica-alumina, and fluorinated γ-alumina (with 0.3 wt % F.).

Although a fair amount of literature exists regarding the use of fluorine to increase catalyst acidity, no mention has been found of the use of fluorinated alumina for methanol dehydration. Fluorine incorporated in an oxide catalyst replaces surface O or OH. Because fluorine is very electronegative, it polarizes the lattice more than the group it has replaced, thus increasing the acidity of both Bronsted and Lewis sites. Only small amounts of fluorine are necessary for increasing acid strength. It has been found that the first 0.5 wt% of HF added was the most effective and appeared to remain on the surface to influence acid sites in proportion to surface area covered. Larger amounts of acid react with bulk alumina to form crystallites of basic aluminum fluoride. As brought out hereafter, fluorinated alumina is the now preferred catalyst for use in this invention.

Each of the selected catalysts was tested, and the results are summarized in Tables IV through IX as follows:

TABLE IV

Methanol Dehydration over 0.1653 g Silica-Alumina diluted with 2.08 g quartz.

| Temperature (C.) | Methanol Feed Rate (g/hr) | whsv (1/hr) | Product mole % | | | Methanol Conversion | |
|---|---|---|---|---|---|---|---|
| | | | DME % | $H_2O$ % | MeOH % | DME % | $H_2O$ % |
| 250 | 0.384 | 2.32 | 30.0 | 30.4 | 39.7 | 60.2 | 60.5 |
| 250 | 0.853 | 5.16 | 21.0 | 22.1 | 56.9 | 42.5 | 43.7 |
| 200 | 0.384 | 2.32 | 8.0 | 8.6 | 83.3 | 16.2 | 17.2 |
| 200 | 0.853 | 5.16 | 4.6 | 5.0 | 90.3 | 9.3 | 10.0 |
| 250 | 0.853 | 5.16 | 19.0 | 19.0 | 62.0 | 38.0 | 30.0 |
| 300 | 0.853 | 5.16 | 39.0 | 39.3 | 21.7 | 78.2 | 78.3 |
| 300 | 1.82 | 11.02 | 29.1 | 28.7 | 42.3 | 57.9 | 57.6 |
| 350 | 1.82 | 11.02 | 39.3 | 40.3 | 20.4 | 79.3 | 79.8 |
| 350 | 0.853 | 5.16 | 41.8 | 42.8 | 15.4 | 84.5 | 84.8 |
| 250 | 0.853 | 0.85 | 19.0 | 19.3 | 61.7 | 38.1 | 38.4 |

TABLE V

Methanol Dehydration over 0.1652 g Phosphated Alumina (P/Al = 1.0) diluted with 2.168 g quartz.

| Temperature (C.) | Methanol Feed Rate (g/hr) | whsv (1/hr) | Product mole % | | | Methanol Conversion | |
|---|---|---|---|---|---|---|---|
| | | | DME % | $H_2O$ % | MeOH % | DME % | $H_2O$ % |
| 250 | 0.853 | 5.16 | 14.0 | 14.1 | 71.8 | 28.0 | 28.3 |
| 250 | 0.384 | 2.32 | 18.7 | 18.7 | 62.6 | 37.4 | 37.4 |
| 200 | 0.384 | 2.32 | 2.8 | 2.7 | 94.5 | 5.6 | 5.3 |
| 200 | 0.853 | 5.16 | 1.9 | 1.7 | 96.5 | 3.7 | 3.4 |
| 250 | 0.853 | 5.16 | 14.0 | 13.3 | 72.6 | 27.9 | 26.9 |
| 300 | 0.853 | 5.16 | 42.2 | 41.5 | 16.3 | 83.8 | 83.6 |
| 300 | 1.82 | 11.01 | 32.9 | 32.1 | 35.0 | 65.3 | 64.7 |
| 350 | 1.82 | 11.01 | 42.1 | 42.4 | 15.5 | 84.5 | 84.6 |
| 350 | 4.68 | 4.68 | 36.3 | 33.8 | 29.9 | 70.8 | 69.3 |
| 350 | 0.853 | 0.853 | 42.5 | 42.8 | 14.7 | 85.2 | 85.3 |
| 250 | 0.853 | 0.85 | 11.4 | 11.7 | 76.9 | 22.9 | 23.3 |

TABLE VI

Methanol Dehydration over undiluted 0.9708 g Phosphated-Alumina (P/Al = 1).

| Temperature (C.) | Methanol Feed Rate (g/hr) | whsv (1/hr) | Product mole % | | | Methanol Conversion | |
|---|---|---|---|---|---|---|---|
| | | | DME % | $H_2O$ % | MeOH % | DME % | $H_2O$ % |
| 250 | 4.68 | 5.16 | 11.1 | 11.7 | 77.1 | 22.4 | 23.3 |
| 200 | 4.68 | 5.16 | 1.5 | 1.5 | 97.0 | 3.1 | 2.9 |
| 250 | 4.68 | 5.16 | 14.1 | 13.3 | 72.5 | 28.0 | 26.8 |
| 300 | 4.68 | 5.16 | 43.1 | 43.9 | 13.1 | 86.8 | 87.0 |
| 350 | 4.68 | 5.16 | 42.7 | 43.2 | 14.1 | 85.8 | 86.0 |
| 250 | 4.68 | 5.16 | 11.8 | 12.4 | 75.8 | 23.7 | 24.7 |

TABLE VII

Methanol Dehydration over 0.1653 g γ-Alumina diluted with 2.167 g quartz.

| Temperature (C.) | Methanol Feed Rate (g/hr) | whsv (1/hr) | Product mole % | | | Methanol Conversion | |
|---|---|---|---|---|---|---|---|
| | | | DME % | H$_2$O % | MeOH % | DME % | H$_2$O % |
| 250 | 0.853 | 5.16 | 30.5 | 30.4 | 39.1 | 61.0 | 60.9 |
| 250 | 0.384 | 2.32 | 34.5 | 34.5 | 31.1 | 68.9 | 68.9 |
| 200 | 0.384 | 2.32 | 7.7 | 8.6 | 83.7 | 15.6 | 16.9 |
| 200 | 0.853 | 5.16 | 5.2 | 6.0 | 88.9 | 10.4 | 11.8 |
| 250 | 0.853 | 5.16 | 30.4 | 30.4 | 39.3 | 60.7 | 60.7 |
| 300 | 0.853 | 5.16 | 42.8 | 43.4 | 13.8 | 86.1 | 86.2 |
| 300 | 1.82 | 11.0 | 39.1 | 40.1 | 20.7 | 79.1 | 79.5 |
| 300 | 4.68 | 28.3 | 27.6 | 29.7 | 42.8 | 56.2 | 58.1 |
| 350 | 4.68 | 28.3 | 42.0 | 43.0 | 15.0 | 84.8 | 85.2 |
| 350 | 7.4 | 44.8 | 34.3 | 33.6 | 32.1 | 68.1 | 67.7 |
| 250 | 0.853 | 5.16 | 31.5 | 31.2 | 37.3 | 62.8 | 62.6 |

TABLE VIII

Methanol Dehydration over 0.1654 g Fluorinated γ-Alumina diluted with 2.202 g quartz.

| Temperature (C.) | Methanol Feed Rate (g/hr) | whsv (1/hr) | Product mole % | | | Methanol Conversion | |
|---|---|---|---|---|---|---|---|
| | | | DME % | H$_2$O % | MeOH % | DME % | H$_2$O % |
| 250 | 0.853 | 5.16 | 30.1 | 32.1 | 37.8 | 61.4 | 62.9 |
| 250 | 0.384 | 2.32 | 37.3 | 39.7 | 23.0 | 76.5 | 77.6 |
| 200 | 0.384 | 5.16 | 9.3 | 11.2 | 79.5 | 18.9 | 22.0 |
| 200 | 0.853 | 5.16 | 5.8 | 7.3 | 86.9 | 11.7 | 14.4 |
| 250 | 0.853 | 5.16 | 31.0 | 30.9 | 38.0 | 62.0 | 61.9 |
| 300 | 0.853 | 5.16 | 42.0 | 43.9 | 14.1 | 85.6 | 86.1 |
| 300 | 1.82 | 11.00 | 39.9 | 41.8 | 18.4 | 81.3 | 82.0 |
| 300 | 4.68 | 28.30 | 31.0 | 26.9 | 42.1 | 59.5 | 56.2 |
| 350 | 4.68 | 28.30 | 37.4 | 34.1 | 28.6 | 72.3 | 70.4 |
| 350 | 7.4 | 44.74 | 39.9 | 41.4 | 18.8 | 80.9 | 81.5 |
| 350 | 4.68 | 28.30 | 39.7 | 41.1 | 19.2 | 80.5 | 81.0 |
| 300 | 4.68 | 28.30 | 33.3 | 31.1 | 35.5 | 65.2 | 63.6 |
| 250 | 0.853 | 5.16 | 32.4 | 33.1 | 34.5 | 65.2 | 65.8 |
| 250 | 0.853 | 5.16 | 27.7 | 25.7 | 46.6 | 54.3 | 52.4 |
| 350 | 7.4 | 44.74 | 40.4 | 39.6 | 20.0 | 80.2 | 79.8 |
| 350 | 11.75 | 71.04 | 40.0 | 38.0 | 22.0 | 78.4 | 77.5 |
| 350 | 17.38 | 105.00 | 35.6 | 35.3 | 29.1 | 71.0 | 70.8 |
| 350 | 24.01 | 145.20 | 32.1 | 30.9 | 37.0 | 63.4 | 62.5 |
| 250 | 0.853 | 5.16 | 30.0 | 29.3 | 40.7 | 59.5 | 59.0 |
| 250 | 1.82 | 11.00 | 16.9 | 16.3 | 66.9 | 33.5 | 32.7 |
| 250 | 4.68 | 28.30 | 12.0 | 11.3 | 76.7 | 23.9 | 22.8 |
| 250 | 0.384 | 2.32 | 39.0 | 38.6 | 22.4 | 77.7 | 77.5 |
| 250 | 0.853 | 5.16 | 28.0 | 26.7 | 45.3 | 55.2 | 54.1 |
| 250 | 7.4 | 44.74 | 9.5 | 9.8 | 80.7 | 19.1 | 19.5 |
| 301 | 7.4 | 44.74 | 31.7 | 29.8 | 38.5 | 62.2 | 60.7 |
| 300 | 4.68 | 28.30 | 32.1 | 31.2 | 36.7 | 63.6 | 62.9 |
| 300 | 17.38 | 105.08 | 20.3 | 16.9 | 62.7 | 39.3 | 35.0 |
| 300 | 24.01 | 145.16 | 12.5 | 11.0 | 76.6 | 24.5 | 22.3 |
| 250 | 0.853 | 5.16 | 29.8 | 28.7 | 41.5 | 58.9 | 58.1 |

TABLE IX

Methanol with 15 vol % unleaded gasoline additive. Dehydration over 0.1654 g Fluorinated γ-Alumina diluted with 2.202 g quartz.

| Temperature (C.) | Methanol Feed Rate (g/hr) | whsv (1/hr) | Product mole % | | | Methanol Conversion | |
|---|---|---|---|---|---|---|---|
| | | | DME % | H$_2$O % | MeOH % | DME % | H$_2$O % |
| 250 | 0.853 | 5.16 | 32.6 | 28.0 | 39.4 | 62.4 | 58.7 |
| 300 | 6.3 | 38.09 | 34.2 | 28.7 | 37.1 | 64.8 | 60.7 |
| 350 | 14.8 | 89.48 | 36.1 | 30.4 | 33.5 | 68.4 | 64.5 |
| 350 | 20.4 | 123.34 | 33.8 | 31.1 | 35.1 | 65.8 | 63.9 |
| 250 | 0.853 | 5.16 | 33.4 | 30.7 | 35.9 | 65.0 | 63.1 |

For purposes of comparison, the catalyst activities are shown in FIG. 6. Conversion of methanol to DME is shown for each catalyst at a weight hourly spaced velocity (WHSV) of 5.16/hr. At this low WHSV, the γ-Alumina and 0.3% F./γ-Alumina were practically identical in activity. These two catalysts were also compared at a WHSV of 45/hr. At the increased space velocity, the fluorinated alumina was more active.

Several early runs were made with the silica-alumina catalyst in both diluted and undiluted beds, and the silica-alumina was tested at temperatures ranging from 200° C. to 350° C., and at space velocities ranging from 2.32 to 11.02 g MEOH/hr-g catalyst. As with each catalyst run, the catalyst was tested at "baseline" conditions of 250° C. and 5.16 WHSV at start-of-run (SOR) and end-of-run (EOR) to monitor any activity loss. From Table IV, a slight loss in activity over the length of the run is observed (42-43% methanol conversion at SOR, and 38% conversion at EOR).

The second catalyst tested was the phosphated alumina, with a ratio P/Al=1.0 ("AlPO$_4$"). Both the phosphated alumina, and the fluorinated alumina produced a peak attributed to formaldehyde (the peak disappeared after about 30 minutes of testing).

The phosphated alumina was tested at temperatures ranging from 200° C. to 350° C., and at space velocities from 2.32 to 28.3 WHSV (Tables V and VI). The silica-alumina was more active at lower temperatures (200-250° C.), but the phosphated alumina was more active at the higher temperatures (300-350° C.). At 350° C. and 5.2 WHSV the conversion obtained from both catalysts is the same—about 85%, the equilibrium conversion. The phosphated alumina also lost some activity during the run; conversion at 250° C., 5.2 WHSV dropped from about 28% to 23% at EOR.

In order to test the validity of results from diluted catalyst beds, the phosphated alumina was tested undiluted. Methanol conversion at identical temperature and space velocity is the same (within experimental error) for both diluted and undiluted beds (Tables V and VI). For example at 250° C., 5.16 WHSV, EOR conversion was 23% in the diluted bed and about 24% in the diluted bed. At 200° C., 5.16 WHSV, conversion was 3.4-3.7% in the diluted bed and 2.9-3.1% in the undiluted bed.

The third catalyst tested in the reactor system was γ-alumina The γ-alumina was found to be more active than either the silica-alumina or the phosphated alumina. The increased activity is especially apparent at the larger space velocities (45/hr, FIG. 6). At 350° C., the γ-alumina provided 68% methanol conversion at a space velocity as high as 44.7 g MEOH/hr-g catalyst the γ-alumina also did not appear to deactivate as did the first two catalysts: EOR conversion at 250° C. and 5.2 whsv was 62-63%, while SOR and middle-of-run (MOR) activities at these conditions were about 61% methanol conversion (Table VII).

Based on the encouraging results with the high-surface area γ-alumina, fluorine was applied to increase surface acidity. A fluorinated catalyst with 0.3 wt% F was prepared. The catalyst was tested over three operating days. The fluorinated γ-alumina was tested at temperatures from 200° C. to 350° C., and at space velocities as high as 145.2 g MEOH/hr-g catalyst (Table VIII).

The fluorinated alumina was found to be the most active catalyst for methanol dehydration. Even at 350° C. and 145.2 WHSV, conversion of 62% was observed. The fluorinated catalyst did not lose significant activity over the three days (approximately 30 hours) of running. At SOR, methanol conversion was about 62% at 250° C. and 5.2 WHSV; at EOR on the third day the conversion was 58–59% at those conditions.

A final run was performed with the same fluorinated catalyst to determine the effect of impurities in the methanol feed. A mixture of 15 volume % unleaded gasoline and 85 volume % methanol was prepared. The fluorinated catalyst was started up with pure methanol, then feed was switched to the gasoline blend. After exposure at 350° C. and WHSV of 89–123 (based on the methanol flow rate), the catalyst feed was switched back to pure methanol. The catalyst was not deactivated by the use of the gasoline/methanol blend. SOR and EOR conversion at the baseline conditions was 58–62% and 63–65%, respectively (Table IX). The catalyst maintained activity in the gasoline/methanol mixture equivalent to the pure methanol (FIG. 7).

A second order model based on methanol concentration and an Arrhenius law dependence on temperature fit the data well. If C is the concentration of methanol then the second order model for methanol conversion is $$r_d = k \cdot C^2, \qquad (1)$$

where
- $r_d$ = conversion rate of methanol to DME and water, g methanol/hr·g catalyst.
- C = concentration of methanol, g methanol/g feed.
- k = second order rate constant, (g feed)2·g methanol/hr·g catalyst.

The rate constant, k, is expected to follow the Arrhenius law for temperature dependence $$k = k_o e^{-E_a/RT} \qquad (2)$$

with
- $k_o$ = apparent pre-exponential factor
- $E_a$ = apparent activation energy, cal/mol
- R = gas constant, 1.987 cal/mol·K,
- T = absolute temperature, K.

Introducing the dimensionless fractional conversion $$x = C/C^o \qquad (3)$$

where $C^o$ is the methanol concentration (g methanol/g feed) at the reactor inlet, and substitution into equation provides $$r_d = k_o \cdot e^{-E_a/RT} (C^o)^2 (1-x)^2. \qquad (4)$$

For an ideal plug flow reactor, with (mass) flow rate, F, and differential catalyst weight, $dW_c$, the design equation is $$d(C \cdot F)/dW_c = r_d. \qquad (5)$$

Distance through the reactor, z, and the superficial cross-sectional flow area, A, of the reactor are related to the differential catalyst weight, $dW_c$, by $$dW_c = \rho_b \cdot A \cdot dz, \qquad (6)$$

where $\rho_b$ is the catalyst bulk density, g/m³. Since there is no change in moles as the reaction proceeds, and with the inlet mass feed flow rate of $F_o$, equation 5 combined with equation 3 becomes $$r_d = -F_o \cdot C^o \cdot (dx/dW_c). \qquad (7)$$

Combining equations 4 and 7, and rearranging yields $$\frac{dx}{(1-x)^2} = k \cdot C^o \cdot d(W_c/F_o) \qquad (8)$$

The ratio $W_c/F_o$ is the reciprocal of the weight hourly space velocity, WHSV. Equation 8 is integrated from the inlet of the reactor with known feed concentrations to the reactor outlet. Thus $$x/(1-x) = C^o(W_c/F_o), \qquad (9)$$

or $$x = \frac{k \cdot C^o \cdot (W_c/F_o)}{(1 + k \cdot C^o \cdot (W_c/F_o))}. \qquad (10)$$

the term, $C^o \cdot (W_c/F_o)$, is the reciprocal of the WHSV based on methanol rather than total gas feed rate. This term was used to compare the catalyst activities when gasoline was added to the methanol. Bear in mind that $$k = 3.156 \times 10^{10} \cdot e^{-23,000/RT}. \qquad (11)$$

The apparent activation energy, $E_a = 23,000$ cal/mol, and the apparent pre-exponential factor, $k_o = 3.156 \times 10^{10}$, were determined by linear regression of the linear equation form of equation 9 combined with equation 2, $$\ln[x/(1-x)] = \ln[k_o \cdot C^o \cdot (W_c/F_o)] + E_a/R \cdot (1/T). \qquad (12)$$

In this case $\ln[x/(1-x)]$ is the dependent variable, and $1/T$ is the independent variable. A plot of $\ln[x/(1-x)]$ versus $1/T$ gave straight lines for each value of $W_c/F_o$.

The predicted dependence of the conversion on the WHSV of the reactor and inlet feed concentration of methanol for the fluorinated γ-alumina is shown in FIG. 8. The second order kinetic model adequately describes the observed methanol conversions at 250–350° C., and 2.32–145 WHSV.

Reactor 52 was sized using catalyst performance data as brought out above to operate at 95% of equilibrium conversion of methanol to dimethyl ether and at a temperature of 350° C. This yielded a WHSV of 40/hr and a total catalyst loading of 25g. A reactor length of 62 cm (2.5 inches) was chosen to provide a ratio of reactor length to catalyst particle diameter of 90, which is more than adequate to avoid channeling and to provide for effective catalyst utilization and conversion.

The thermal conductivity of the catalyst is needed to calculate the time required to preheat the reactor. Since an experimental value for this material does not exist, a value was estimated. The value calculated was 20% lower than those earlier reported by others for similar catalysts. The lower value was used to provide a conservative determination of the time required to heat the reactor.

The thermal conductivity of the catalyst indicated that heating the catalyst from the outside of the tube would take longer than the 15 s targeted at the outset of the design. Thus, wire heaters were placed inside of the reactor and spaced about ⅛ inch apart. To maintain a constant wire temperature of 850° C., the power to the preheaters were made to follow the typical curve shown in FIG. 9. This curve was generated by solution of the time dependent heat transfer equation in radial coordinates using a Crank-Nicholson finite difference technique.

Pressure drop in the catalyst bed was calculated for flow through packed columns. Ground catalyst and pellet densities indicated that the catalyst has a macropore void fraction of 0.5–0.6. Pressure drop through the reactor was calculated to be less than 7 kPa (1 psi). The design specifications for the electrically preheated catalyst bed are set forth in Table X as follows:

TABLE X

Design Specifications for Electrically Preheated Catalyst Bed.

| Parameter | Specification |
|---|---|
| Reactor | |
| Material | Stainless Steel |
| Tube Outside Diameter | ⅜ in. |
| Wall thickness | 0.035 in. |
| Catalyst | Preheated γ-Alumina |
| Weight | 25 g |
| Particle Diameter | 0.6–0.8 mm |
| Preheater | |
| Maximum Power Input | 460 W |
| Preheat time | 15 s |
| Wire Heaters | Nichrome |
| Diameter | 0.032 in. |
| Length | 2 each, 8 in. |
| Resistance | 0.42 ohm |
| Design Temperature | 850° C. |
| Maximum Temperature | 1100° C. |
| Maximum Current | 10 A |

The methanol dehydration reaction is exothermic which results in the products having a temperature approximately 200° C. higher than the reactants. Some of the reaction heat will be lost through the reactor insulation, and superheater outlet temperature can be reduced to control the catalyst bed temperature.

The reactor has two distinct control modes - the initial heat-up to reaction temperature, and load following cold engine operation.

During the reactor heat-up transient, an open loop, power-time program can be used as typically shown in FIG. 9. Catalyst bed power decreases with time to maintain a relatively constant wire temperature. Just before the start of methanol flow, the vaporizer power will be turned on to pre-heat it to 75° C. The superheater has very little thermal mass and will be powered-up just before the start of methanol flow.

During engine operation, the reactor control will be in a load following mode, and a DME flow demand signal will be generated based on engine temperature and load as indicated by the flow diagram of FIG. 10. This will be translated into a signal to control the electronic fuel injectors.

Catalytic bed heating will be turned off after methanol flow is begun since the dehydration reaction is exothermic. Vaporizer and superheater power will follow methanol flow in an open loop mode. Superheater power will be reduced, as a percentage of vaporized power, with continuing reactor operation to control reactor temperature.

Reactor 52 has a total system weight of 1.2 kg, as shown in Table XI as follows:

TABLE XI

Weights of Electrically Heated Reactor Components

| Component | Weight (g) |
|---|---|
| Boiler | 30 |
| Superheater | 32 |
| Reactor | 50 |

TABLE XI-continued

Weights of Electrically Heated Reactor Components

| Component | Weight (g) |
|---|---|
| Inner Flange | 50 |
| Container | 1040 |
| TOTAL | 1202 (2.6 lbs.) |

The overall dimensions of the reactor are 27.7 cm (10.5 inches)×11.4 cm (4.5 inches)×7.0 cm (2.75 inches) and occupies less than 840 cm$^3$ (130 in.$^3$) of space.

DME is added to combustion air and methanol only during start-up or for a short period of cold running operation (until the engine has been running for a sufficient time to heat above cold running). It is not intended that the DME be added on a continuous basis during running (other than during the initial cold running). During cold starting and cold running, it has been found that injection of 5% to 30% DME with respect to total fuel provides best results.

An alternate embodiment 94 of an on-board system for generating DME from methanol and storing the DME for later use is shown in FIG. 11. System 94 is designed to supply DME to the engine at the time of cold start from stored DME produced during previous engine operation, and could, of course, supply dimethyl ether at other times, as needed, to enhance engine operation, particularly cold operation. A DME storage container 96 is provided, and is sized to provide 1 kg/hr of DME to the engine for 40 minutes or a capacity of 670 g. The DME generating portion of the system recharges the storage at 0.5 kg/hr. The system must operate at a pressure of 15 atm. so that the DME can be stored in liquid form at temperatures up to 60° C.

As shown in FIG. 11, methanol stored in tank, or reservoir, 98 is pumped by pump 100 to fuel injector 102. Methanol is injected by fuel injector 102 into passage, or mixing area, 104 (formed by passage walls 106). Air passes through air cleaner 108 and is passed by throttle 110 to passage 104 for combining with methanol thereat (which methanol is vaporized at mixing area 104 if sufficiently heated combustion air is present at the mixing area). The air/methanol mixture is coupled to cylinder 112 with injection into the cylinder occurring when inlet valve 114 is open (with piston 116 retracted and exhaust valve 118 closed).

As also indicated in FIG. 11, methanol is also pumped from tank 98 by pump 100 to boiler/superheater 120 of methanol dehydration and storage unit 122, and the output from superheater 120 is coupled through reactor 124 to condenser 126 (having fan 128 driven by motor 130 connected therewith). Generated DME is coupled from condenser 126 and stored in receptacle, or tank, 96 until needed. When needed, the DME is withdrawn from tank 96 and supplied to fuel injector 132 (as by pumping, for example) for injection into passage 104 for combination thereat with methanol and air. As also indicated in FIG. 11, operation of injectors 102 and 132 is controlled by electrical output signals from fuel control unit 134, which unit also receives an input from temperature sensor 136 (connected to sense the temperature of cylinder 112).

FIG. 12 illustrates operation of the system of FIG. 11. As indicated, superheater 120 can be heated by engine exhaust (after the engine has reached operating temperature which is estimated to be 5 to 10 minutes after engine start). The superheated methanol flows from superheater 120 into catalyst reactor 124 where the dehydration takes place, and the reaction products are condensed in air cooled heat exchanger 126. The DME is separated from the water and un-reacted methanol by gravity in the storage vessel, and the water and un-reacted methanol are fed to the engine for disposal.

Boiler/superheater 120 is a once-through design and uses a single ⅛ in. tube with the minimum standard wall thickness (0.030 inches). The tubing is coiled helically inside a larger tube through which the exhaust gas flows. The design specifications for boiler superheater 120 are summarized in Table XII as follows:

TABLE XII

Boiler/Superheater Heat Exchange Specifications for Exhaust Heated Methanol Converter

| Parameter | Specification |
| --- | --- |
| Methanol Flow Rate | 0.5 kg/hr |
| BOILER SECTION | |
| Overall Heat Transfer Coefficient | 44 W/m²K |
| Log Mean Temperature Difference | 320° C. |
| Power Required | 185 W |
| Area Required | 130 cm² |
| SUPERHEATER SECTION | |
| Overall Heat Transfer Coefficient | 43 W/m²K |
| Log Mean Temperature Difference | 120° C. |
| Heat Transfer Rate | 35 W |
| Area | 38 cm² |
| CONFIGURATION | ⅛ in. OD tubing in ¾ in. helical coil inside a 1 in. exhaust tube |
| WEIGHT | |
| ⅛ in. Tubing | 560 g |
| 1 in. Tubing | 1375 g |
| PRESSURE DROP | |
| Methanol Side | 60 psi (415 kPa) |
| Exhaust Side | 0.4 psi (2.75 kPa) |

An electrically heated reactor was selected for the system to avoid using exhaust gas diverter valves to control reactor temperature. The size of the catalyst bed was assumed to be the same as used in the electrically heated reactor as described hereinabove.

Specifications for the condenser are summarized in Table XIII:

TABLE XIII

Condenser Heat Exchanger Specifications

| Parameter | Value |
| --- | --- |
| Methanol Flow Rate | 0.5 kg/hr |
| GAS/GAS COOLING | |
| Overall Heat Transfer Coefficient | 8 W/m²K |
| Log Mean Temperature Difference | 340° C. |
| Heat Transfer Rate | 165 W |
| Area | 600 cm² |
| CONDENSATION | |
| Overall Heat Transfer Coefficient | 45 W/m²K |
| Log Mean Temperature Difference | 66° C. |
| Power Required | 150 W |
| Area Required | 495 cm² |
| TOTAL AREA | 1095 cm² |
| CONFIGURATION | ⅛ in. OD tubing arranged in bundles ¼ in. center to center and 8-12 in. long. Requires ⅛-¼ hp motor to drive cooling fan. |
| WEIGHT | |
| Tubing | 300 g |
| Fan + Motor | 1000 g |
| PRESSURE DROP | |
| DME/Methanol/Water Side | negligible |
| Air | none, 1.5 m/s superficial velocity. |

Ambient cooling air is blown by fan 128 over a configuration of ⅛ inch tubes in a manifold approximately 20.32 cm (8 in.)×20.32 cm (8 in.), and 2-3 tubes deep. The condensate flows by gravity into separation vessel 96. The line between the condenser and separator is equipped with check valve 138 to maintain superheater pressure after the system is turned off. At 87% conversion, the water and methanol condenses the mixture. The average condensate is 35% methanol and water by weight. The methanol/water condense over the temperature range 160° C. to 80° C.

As shown in FIG. 12, separator vessel 96 consists of a schedule 40, 3 inch diameter×8.25 inch long pipe 140 mounted vertically. A cone 142 is welded or flanged into the bottom of the pipe. The condensate enters at the top of the vessel, water/methanol mixture is drawn off from the bottom of the vessel, and DME is drawn off at some point above the water/methanol effluent port.

Two level control systems (one of which includes float 146, level sensor 148, level control 150, valve control 152 and valve 154, and the other of which includes float 158, level sensor 160, level control 162, valve control 164, valve 166 and pump motor control 168) determine if water/methanol is purged from the system into the water intake, and if the DME level is sufficient to shut off the reactor. These valves work on a float system since the DME is 65% as dense as the water/methanol.

When the level of DME in the storage vessel reaches a predetermined height, this level is sensed by level sensor 160 and level control 162 causes motor control 168 to turn off pump 100. The water/methanol mixture is maintained at a constant level by level control 148 (connected to level sensor 150) causing venting of liquid through valve 154 (controlled by valve control 152 connected with level control 150) to the engine intake manifold. A pressure relief valve 170 is also incorporated into the system to vent any non-condensibles that may enter the system.

The solubility of DME in water at 24° C. and 5 bar is 35%. At 80° C. and 1 bar DME is soluble in water to 7%. It is unknown how soluble DME is in a 35% methanol/water mixture. Correcting these values for temperature, decreases the solubility by a factor of 4 at 60° C. The hotter the mixture is during separation, the less DME is lost in the water/methanol phase. Thus, an 8-10% loss of DME in the water is expected from a first order analysis. There is the possibility that DME is more soluble in methanol/water mixtures, or that DME is miscible with a methanol water phase.

The freezing point of the water/methanol mixture is −35° C. If the reactor achieves an equilibrium DME/water/methanol mixture at an effluent temperature of 200° C., the mixture could freeze at −22° C. This combination of effluent temperature and equilibrium are unlikely to occur, so small amounts of water/methanol remaining in the separator would not freeze until well below −20° C. If conditions colder than −35° C. are expected for the operation, heat tracing on the lines would be necessary to thaw them prior to running the reactor system. The DME which dissolves in the water/methanol phase would further lower the freezing point of the mixtures (probably at least 10° C.) since its normal freezing point is −140° C.

In the event that DME, water, and methanol form a miscible system at the temperatures and pressures encountered in the storage and dehydration system, the single phase mixture could be utilized for starting the engine. Engine efficiency, however, would be lower because some of the ignition energy of the fuel would normally go into raising the pressure of the system would be consumed to vaporize the water.

Stream numbers (1 through 7), indicated in FIG. 12, are associated with percentages and temperatures according to Table XIV as follows:

TABLE XIV

| | Steam Number | | | | | | |
|---|---|---|---|---|---|---|---|
| | 1 | 2 | 3 | 4 | 5 | 6 | 7 |
| | Temperature (°C.) | | | | | | |
| | −20 | 500 | 350 | 450 | 60 | 60 | 60 |
| % DME | 0 | 0 | 0 | 43 | 43 | 90 | 4 |
| % MeOH | 100 | 0 | 100 | 13 | 13 | 10 | 357 |

Start-up of the system is delayed until exhaust gas temperature reaches 500° C. (as sensed by temperature sensor 172). Methanol is then caused to be pumped into boiler/superheater 120 and a reactor electric pre-heater is turned on (temperature sensor 174 and temperature control 176 are connected with the electric pre-heater). Temperature sensor 178 senses the output of reactor 124 (temperature sensor 178 is connected with temperature control 180 to control valve 164, and temperature sensor 182 senses the output of condensor 126 (temperature sensor 182 is connected with temperature control 184 to control fan motor 130). After initial electric preheat has been applied, the reactor temperature is controlled by diverting exhaust gas around the boiler/superheater.

An estimate of system weight is summarized in Table XV as follows:

TABLE XV

| Weights of Components for Exhaust Heated Reactor | |
|---|---|
| Component | Weight (g) |
| Boiler/Superheater | 1935 |
| Reactor | 50 |
| Condenser | 300 |
| DME Separator/Storage | 9400 |

The largest single component is the DME separator/storage vessel.

As can be appreciated from the foregoing, this invention provides heretofore unavailable systems and methods for enhancing performance of an alcohol fueled engine, and, more particularly, a methanol fueled engine to achieve reliable cold starts and/or enhanced engine operation under cold conditions.

What is claimed is:

1. Apparatus for enhancing performance of an internal combustion engine under cold conditions, said apparatus comprising:

generating means for generating ether from alcohol on-board a vehicle having said internal combustion engine thereon, said generating means including dehydration means having vaporizing means for receiving said alcohol, superheater means for receiving said vaporized alcohol and heating the same to the alcohol reaction temperature, and catalytic means for receiving said heated vaporized alcohol and causing said ether to be generated therefrom; and application means for applying said ether to said engine whereby at least one of cold starting and cold operation of said engine can be effected.

2. The apparatus of claim 1 wherein said alcohol is methanol, and wherein said generating means includes means for generating dimethyl ether from said methanol.

3. The apparatus of claim 1 wherein said catalytic means includes fluorinated alumina catalyst.

4. The apparatus of claim 1 wherein said apparatus includes control means for controlling generation of said ether and application of said ether to said engine.

5. The apparatus of claim 4 wherein said control means also includes computer means for controlling heating of said generating means.

6. The apparatus of claim 4 wherein said application means includes means for causing said ether to be applied to said engine substantially immediately after being generated.

7. The apparatus of claim 4 wherein said apparatus includes storage means for storing said generated ether, and wherein said application means includes means for causing storage of said generated ether and application of said stored ether to said engine.

8. The apparatus of claim 1 wherein said apparatus includes receiving means for receiving said alcohol and providing an alcohol output, wherein said generating means provides a vaporized ether output, and wherein said application means receives said alcohol and vaporized ether and mixes the same with air with said resulting mixture being applied to said engine.

9. The apparatus of claim 8 wherein said receiving means receives a mixture of alcohol and gasoline and provides an alcohol and gasoline mixture output whereby a mixture of alcohol, gasoline and ether is mixed with air for application to said engine.

10. Apparatus for enhancing performance of a methanol-fueled internal combustion engine, said apparatus comprising:

methanol supply means;

generating means for receiving methanol from said methanol supply means and generating dimethyl ether therefrom on-board a vehicle having said methanol supply means and said internal combustion engine mounted thereon;

mixing means for receiving methanol from said methanol supply means and combustion air for mixing at said mixing means and supplying a mixture of said methanol and combustion air to said engine, said mixing means also being adapted to receive dimethyl ether from said generating means so that, when received, said mixing means supplies a mixture of methanol, dimethyl ether and air to said engine; and control means for controlling generation of said dimethyl ether and supplying of said dimethyl ether to said mixing means whereby at least one of said cold starting and cold running of said engine is enhanced.

11. The apparatus of claim 10 wherein said generating means includes dehydration means for vaporizing said methanol, heating said vaporized methanol, and converting said heated vaporized methanol to dimethyl ether.

12. The apparatus of claim 11 wherein said generating means includes fluorinated alumina catalyst.

13. The apparatus of claim 10 wherein said methanol supply means supplies a mixture of methanol and gasoline for mixing with said air and dimethyl ether.

14. The apparatus of claim 10 wherein said apparatus includes means for substantially immediately supplying and directing dimethyl ether generated at said generating means to said mixing means.

15. The apparatus of claim 10 wherein said application means includes first means for storing said generated dimethyl ether in liquid form and second means for conducting said stored liquid state dimethyl ether to said mixing area for application in vaporized form as needed for mixing with methanol thereat.

16. Apparatus for enhancing performance of a methanol-fueled internal combustion engine under cold conditions, said apparatus comprising:
  means defining a mixing area;
  first conducting means for conducting air to said mixing area;
  container means for storing methanol on-board a vehicle having said internal combustion engine mounted thereon;
  second conducting means for conducting methanol from said container means to said mixing area;
  dimethyl ether generating means;
  third conducting means for conducting methanol from said container means to said dimethyl ether generating means;
  fourth conducting means for conducting dimethyl ether from said dimethyl ether generating means to said mixing area for combining of said dimethyl ether with said methanol and said air at said mixing area; and
  fifth conducting means for conducting said mixture of dimethyl ether, methanol and air to said engine whereby at least one of cold starting and cold running of said engine can be effected.

17. The apparatus of claim 16 wherein said apparatus includes control means for causing said generated dimethyl ether to be applied substantially immediately after generation to said mixing area through said fourth conducting means.

18. The apparatus of claim 16 wherein said apparatus includes dimethyl ether storage means for receiving dimethyl ether generated by said dimethyl ether generating means, and wherein said apparatus also includes control means for causing dimethyl ether to be withdrawn from said dimethyl ether storage means and supplied through said fourth conducting means to said mixing area.

19. Apparatus for enhancing performance of a spark ignition combustion engine, said apparatus comprising:
  generating means for generating dimethyl ether from methanol on-board a vehicle having said spark ignition combustion means mounted thereon, said generating means including catalytic dehydration means having fluoridized alumina therein to cause formation of said dimethyl ether from said methanol; and
  application means for applying said dimethyl ether to said spark ignition combustion engines for only a predetermined initial period of time to thereby enhance performance of said engine.

20. The apparatus of claim 19 wherein said apparatus includes control means for causing said dimethyl ether to be supplied only during at least one of cold starting and cold running of said engine.

21. The apparatus of claim 19 wherein said application means is connected with said engine to effect substantially immediate application of dimethyl ether generated at said generating means to said engine.

22. The apparatus of claim 19 wherein said apparatus includes storage means for storage of dimethyl ether generated at said generating means, and wherein said application means causes withdrawal of dimethyl ether from said storage means for application to said engine.

23. The apparatus of claim 19 wherein said apparatus includes means for supplying a mixture of methanol and gasoline to said application means whereby a mixture of methanol, gasoline, and dimethyl ether can be supplied to said spark ignition combustion engine.

24. Apparatus for enhancing performance of an internal combustion engine, said apparatus comprising:
  first storage means for storage of an alcohol on-board a vehicle having an internal combustion engine mounted thereon;
  ether generating means for receiving alcohol stored at said first storage means and generating an ether from said alcohol;
  second storage means for storage of said ether generated at said ether generating means;
  means defining a mixing area for mixing of alcohol from said first storage means and ether from said second storage means when said alcohol and ether are substantially simultaneously supplied to said mixing area, said mixing area being communicatible with said engine; and
  control means for controlling application of said alcohol and ether to said mixing area.

25. The apparatus of claim 24 wherein said alcohol is methanol, and wherein said ether generating means generates dimethyl ether from said methanol.

26. The apparatus of claim 24 wherein said first and second storage means are liquid state storage means.

27. The apparatus of claim 24 wherein said control means causes application of said ether to enhance performance of said engine to effect at least one of cold starting and cold running of said engine.

28. The apparatus of claim 24 wherein said first storage means stores a mixture of alcohol and gasoline so that a mixture of alcohol, ether and gasoline can be effected at said mixing area.

29. Apparatus for generating dimethyl ether from methanol, said apparatus comprising:
  vaporing means for vaporizing received methanol;
  superheater means for heating vaporized methanol received from said vaporizing means; and
  dehydrating means including fluorinated alumina catalyst for receiving said methanol from said heating means and generating dimethyl ether therefrom.

30. The apparatus of claim 29 wherein said vaporing means and said dehydrating means also includes heating means.

31. The apparatus of claim 29 wherein said vaporing means, heating means and dehydrating means form a compact reactor unit.

32. The apparatus of claim 29 wherein said reactor unit has a T-shaped casing.

33. A method for enhancing performance of an internal combustion engine, said method comprising:
providing alcohol on-board a vehicle having said internal combustion engine thereon;
generating an ether from said alcohol on-board said vehicle;
mixing said alcohol and ether with air; and
applying said mixture of alcohol, ether and air to said engine for a period of time suitable to effect at least one of cold starting and cold running of said engine.

34. The method of claim 33 wherein said method includes generating dimethyl ether from methanol and applying said dimethyl ether along with said methanol and air to said engine.

35. The method of claim 34 wherein said method includes generating said dimethyl ether by catalytic dehydration of said methanol.

36. The method of claim 35 wherein said catalytic dehydration includes vaporizing said methanol, heating said vaporized methanol to the reaction point of said methanol, and exposing said heated vaporized methanol to a catalyst to form dimethyl ether.

37. The method of claim 36 wherein said methanol includes providing fluorinated alumina as a catalyst.

38. The method of claim 33 wherein said method includes providing gasoline to said methanol to form a mixture thereof.

39. The method of claim 33 wherein said method includes application of said ether to said engine substantially immediately after formation.

40. The method of claim 33 wherein said method includes storing of said ether after generation, and later supplying said stored ether to said engine.

41. The method of claim 40 wherein said methanol includes generating said ether in vaporized form, converting said vaporized ether to liquid form for storage, and converting said stored liquid ether to vapor form before application to said engine.

* * * * *